United States Patent
Kameda

(10) Patent No.: US 12,113,398 B2
(45) Date of Patent: Oct. 8, 2024

(54) STATOR CORE, STATOR UNIT, AND MOTOR

(71) Applicant: NHK SPRING CO., LTD., Yokohama (JP)

(72) Inventor: Yohei Kameda, Yokohama (JP)

(73) Assignee: NHK SPRING CO., LTD., Yokohama (JP)

(*) Notice: Subject to any disclaimer, the term of this patent is extended or adjusted under 35 U.S.C. 154(b) by 0 days.

(21) Appl. No.: 17/768,270

(22) PCT Filed: Oct. 1, 2020

(86) PCT No.: PCT/JP2020/037470
§ 371 (c)(1),
(2) Date: Apr. 12, 2022

(87) PCT Pub. No.: WO2021/075275
PCT Pub. Date: Apr. 22, 2021

(65) Prior Publication Data
US 2024/0136868 A1   Apr. 25, 2024
US 2024/0235287 A9   Jul. 11, 2024

(30) Foreign Application Priority Data
Oct. 16, 2019   (JP) ................................. 2019-189689

(51) Int. Cl.
*H02K 1/18* (2006.01)
*H02K 1/2706* (2022.01)

(52) U.S. Cl.
CPC ............. *H02K 1/18* (2013.01); *H02K 1/2706* (2013.01)

(58) Field of Classification Search
CPC ........... H02K 1/18; H02K 1/27; H02K 1/2706

USPC ..................................................... 310/216.001
See application file for complete search history.

(56) References Cited

U.S. PATENT DOCUMENTS

| 2010/0007236 | A1  | 1/2010 | Sano et al. |          |
|---|---|---|---|---|
| 2013/0187506 | A1* | 7/2013 | Lee .......................... | H02K 1/28 |
|              |     |        |             | 310/156.12 |
| 2015/0180292 | A1* | 6/2015 | Tanaka ................. | H02K 1/2773 |
|              |     |        |             | 29/598 |

(Continued)

FOREIGN PATENT DOCUMENTS

| JP | 2006-333657 | 12/2006 |
|---|---|---|
| JP | 2008-104325 | 5/2008 |

(Continued)

OTHER PUBLICATIONS

PCT International Search Report (w/ English translation) for corresponding PCT Application No. PCT/JP2020/037470, mailed on Dec. 8, 2020, 5 pages.

*Primary Examiner* — Rashad H Johnson
(74) *Attorney, Agent, or Firm* — Dority & Manning, P.A.

(57) ABSTRACT

A stator core that is configured by stacking plural core plates and that is housed inside a case of a motor. The plural core plates include an elastic protrusion-equipped core plate provided with plural elastic protrusions arrayed in a circumferential direction. The elastic protrusions extend toward a radial direction outside from an outer peripheral portion of the elastic protrusion-equipped core plate and are bent in an axial direction. The stator core is supported by the case in a state in which the plural elastic protrusions are in contact with an inner peripheral face of the case and elastically flexed.

7 Claims, 7 Drawing Sheets

(56) References Cited

U.S. PATENT DOCUMENTS

| | | | |
|---|---|---|---|
| 2019/0319504 A1* | 10/2019 | Shiraishi | H02K 1/2773 |
| 2020/0212739 A1* | 7/2020 | Kizu | H02K 1/278 |
| 2022/0190659 A1* | 6/2022 | Jo | H02K 1/2773 |
| 2022/0209597 A1* | 6/2022 | Park | F25B 31/023 |
| 2023/0402887 A1* | 12/2023 | Choi | H02K 16/00 |

FOREIGN PATENT DOCUMENTS

| | | |
|---|---|---|
| JP | 2011-172376 | 9/2011 |
| JP | 2011-214086 | 10/2011 |
| JP | 5181994 | 4/2013 |

\* cited by examiner

STATOR CORE, STATOR UNIT, AND MOTOR

CROSS-REFERENCE TO RELATED APPLICATIONS

The present application is related and has right of priority to JP 2019-189689, which was filed on Oct. 16, 2019, in the Japanese Patent Office, and is a U.S. national phase entry of PCT/JP2020/037470, which was filed on Oct. 1, 2020, both of which are incorporated by reference in their entireties for all purposes.

TECHNICAL FIELD

The present disclosure relates to a stator core, a stator unit including the stator core, and a motor including the stator unit.

BACKGROUND ART

Japanese Patent No. 5181994 discloses an assembly-type stator formed by assembling plural stator pieces around a circumferential direction. Each of the stator pieces includes a yoke portion extending around the circumferential direction, and a tooth extending in a radial direction from the yoke portion. In this assembly-type stator, the yoke portion of each of the plural stator pieces is formed with two slits extending about the circumferential direction from both circumferential direction end faces of the yoke portion. Thus, stress occurring when the plural stator pieces are contained in a case concentrates in a region between these two slits, such that iron loss, which can lead to a drop in electric motor efficiency, is reduced as a result.

Japanese Patent No. 2006-333657 discloses a motor including a stator unit in which a stator core configured by stacking plural core plates is housed inside a case, and a rotor that is capable of rotating with respect to the stator unit. In this motor, the stator core is configured of a first section and a second section fixed so as to overlap both end portions of the first section in an axial line direction. The first section is configured by stacking core plates that have a smaller outer diameter than an inner diameter of the case. Core plates configuring the second section each include a base portion that has the same outer diameter as the core plates configuring the first section, and plural protruding portions that extend out from an outer peripheral portion of the base portion. The stator core is only in contact with the case at these plural protruding portions, such that a region where stress acts on the stator core is reduced.

SUMMARY OF INVENTION

Technical Problem

In the Background Art disclosed in Japanese Patent No. 5181994, the plural stator pieces cannot be applied to an integrated iron stator core that cannot be disassembled. Moreover, depending on the dimensional accuracy of the case and the stator core, circumferential direction end faces of adjacent stator pieces may violently contact one another at an inner radial side of the stator pieces such that compressive stress is generated in the circumferential direction, and so strict dimensional accuracy control is required in order to prevent this. However, such dimensional accuracy control would be extremely difficult to perform during mass production, and would lead to a rise in manufacturing costs even if possible.

In the Background Art disclosed in Japanese Patent No. 2006-333657, the plural protruding portions that extend out from the outer peripheral portion of the base portion of each of the core plates configuring the second section have a high rigidity in the core plate radial direction at portions connected to the base portion. Thus, depending on the dimensional accuracy of the case and the respective protruding portions, radial direction load from the case borne by the respective protruding portions may be transmitted to the base portion of the core plate, such that a large degree of compressive stress is generated at the base portion (yoke portion) of the core plate, which might lead to an increase in iron loss.

In consideration of the above circumstances, an object of the present disclosure is to obtain a stator core, a stator unit including the stator core, and a motor including the stator unit that enable less iron loss than hitherto and that facilitate dimensional accuracy control.

Solution to Problem

A stator core of a first aspect is a stator core that is configured by stacking plural core plates and that is housed inside a case of a motor. The plural core plates include an elastic protrusion-equipped core plate provided with plural elastic protrusions arrayed in a circumferential direction, the elastic protrusions extending toward a radial direction outside from an outer peripheral portion of the elastic protrusion-equipped core plate and being bent in an axial direction. The stator core is supported by the case in a state in which the plural elastic protrusions are in contact with an inner peripheral face of the case and elastically flexed.

The stator core of the first aspect is configured by stacking the plural core plates and is housed inside the motor case. The plural core plates include the elastic protrusion-equipped core plate provided with the plural elastic protrusions arrayed in the circumferential direction. The elastic protrusions extend toward the radial direction outside from the outer peripheral portion of the elastic protrusion-equipped core plate and are bent in the axial direction. The stator core is supported by the case in a state in which the plural elastic protrusions are in contact with the inner peripheral face of the case and elastically flexed. This enables compressive stress to be prevented or effectively suppressed from being generated at a yoke portion of the stator core, thereby enabling less iron loss than hitherto. Moreover, dimensional variation of the case and the stator core can be absorbed by elastic flexing of the plural elastic protrusions, thereby facilitating dimensional accuracy control.

A stator core of a second aspect is the first aspect, wherein the plural elastic protrusions include an inward-facing elastic protrusion with a leading end portion that is bent so as to face a radial direction inside of the elastic protrusion-equipped core plate.

In the stator core of the second aspect, the plural elastic protrusions provided at the outer peripheral portion of the elastic protrusion-equipped core plate include the inward-facing elastic protrusion with the leading end portion that is bent so as to face the radial direction inside of the elastic protrusion-equipped core plate. Thus, when the stator core is displaced in the radial direction with respect to the case, the leading end portion of the inward-facing elastic protrusion contacts the outer peripheral face of the stator core, such that a spring constant of the inward-facing elastic protrusion increases. This enables this displacement to be suppressed, thereby enabling plastic deformation of the plural elastic protrusions including the inward-facing elastic protrusion to be prevented.

A stator core of a third aspect is the first aspect or the second aspect, wherein quenching is performed on the plural elastic protrusions.

In the stator core of the third aspect, quenching is performed on the plural elastic protrusions, thereby enabling settling of the respective elastic protrusions to be suppressed, enabling durability of the respective elastic protrusions to be improved.

A stator core of a fourth aspect is any one of the first aspect to the third aspect, wherein the plural core plates include a flat protrusion-equipped core plate provided with plural flat protrusions arrayed in the circumferential direction, so as to extend toward a radial direction outside from an outer peripheral portion of the flat protrusion-equipped core plate. Leading end portions of the plural flat protrusions are arranged opposing the inner peripheral face of the case, across a gap.

In the stator core of the fourth aspect, the plural core plates include the flat protrusion-equipped core plate provided with the plural flat protrusions arrayed in the circumferential direction so as to extend toward the radial direction outside from the outer peripheral portion of the flat protrusion-equipped core plate. The leading end portions of the plural flat protrusions are arranged opposing the inner peripheral face of the case across the gap. Thus, when the stator core is displaced in the radial direction with respect to the case, the leading end portions of the flat protrusions contact the inner peripheral face of the case, thereby enabling this displacement, namely deformation of the plural elastic protrusions, to be restricted. Plastic deformation of the plural elastic protrusions can be prevented as a result.

A stator unit of a fifth aspect includes a case of a motor, and the stator core of any one of the first aspect to the fourth aspect housed inside the case.

In the stator unit of the fifth aspect, the stator core is housed inside the motor case. Since the stator core is the stator core of any one of the first aspect to the fourth aspect, the above-described operation and advantageous effects are obtained.

A stator unit of a sixth aspect is the fifth aspect, wherein plural grooves, into which the plural elastic protrusions are configured to be inserted, are arrayed in a circumferential direction at the inner peripheral face of the case. A gap is provided between the inner peripheral face of the case and an outer peripheral face of the stator core.

In the stator unit of the sixth aspect, the plural elastic protrusions provided at the outer peripheral portion of the elastic protrusion-equipped core plate included in the stator core are inserted into the plural grooves formed in the inner peripheral face of the case. This enables relative rotation of the stator core in the circumferential direction with respect to the case to be restricted, thereby obviating the need for a rotation stopper such as a key. Moreover, the gap is provided between the inner peripheral face of the case and the outer peripheral face of the stator core, thereby facilitating dimensional accuracy control.

A stator unit of a seventh aspect is the sixth aspect, wherein, in a case in which the stator core is displaced in a radial direction with respect to the case, a part of the outer peripheral face of the stator core contacts a part of the inner peripheral face of the case within an elastic deformation range of the plural elastic protrusions.

In the stator unit of the seventh aspect, a part of the outer peripheral face of the stator core contacts a part of the inner peripheral face of the case in the above-described manner, such that the displacement of the stator core is restricted. In this state, the plural elastic protrusions are still within their elastic deformation range, thereby enabling plastic deformation of the plural elastic protrusions to be prevented.

A motor of an eighth aspect includes the stator unit of any one of the fifth aspect to the seventh aspect, and a rotor core housed inside the stator core included in the stator unit.

In the motor of the eighth aspect, the rotor core is housed inside the stator core included in the stator unit. Since the stator unit is the stator unit of any one of the fifth aspect to the seventh aspect, the above-described operation and advantageous effects are obtained.

Advantageous Effects of Invention

As described above, the stator core, the stator unit, and the motor according to the present disclosure enable less iron loss than hitherto and facilitate dimensional accuracy control.

DESCRIPTION OF EMBODIMENTS

First Exemplary Embodiment

Figure 1:
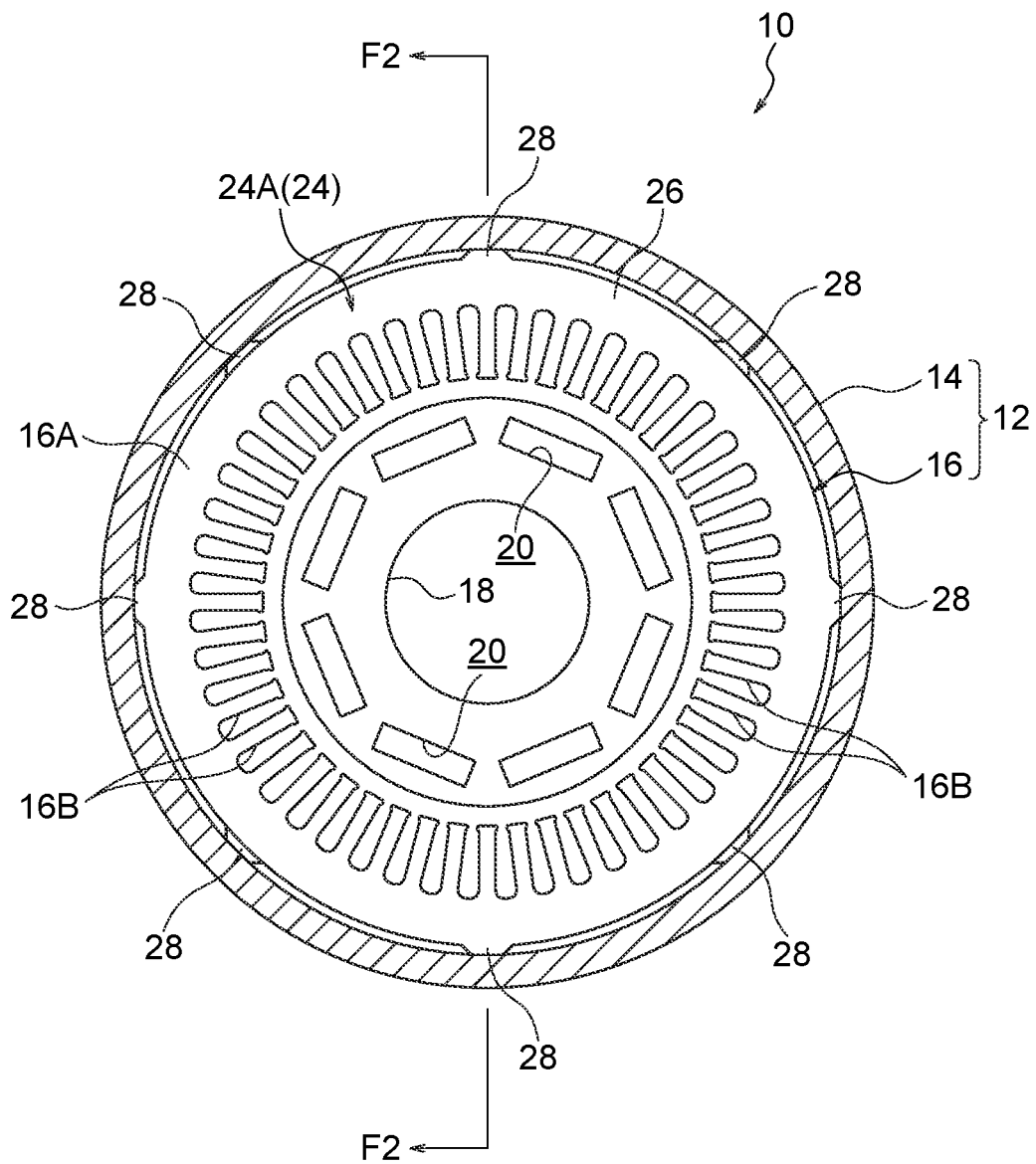
FIG. 1 is a cross-section of a motor according to a first exemplary embodiment of the present disclosure.

Explanation follows regarding a motor 10 according to a first exemplary embodiment of the present disclosure, with reference to FIG. 1 to FIG. 4. As illustrated in FIG. 1, the motor 10 according to the present exemplary embodiment is an inner rotor-type motor in which a rotor core 18 is provided inside a stator unit 12. The stator unit 12 includes a case 14 formed in a bottomed tube shape, and a stator core 16 housed inside the case 14.

Figure 2:
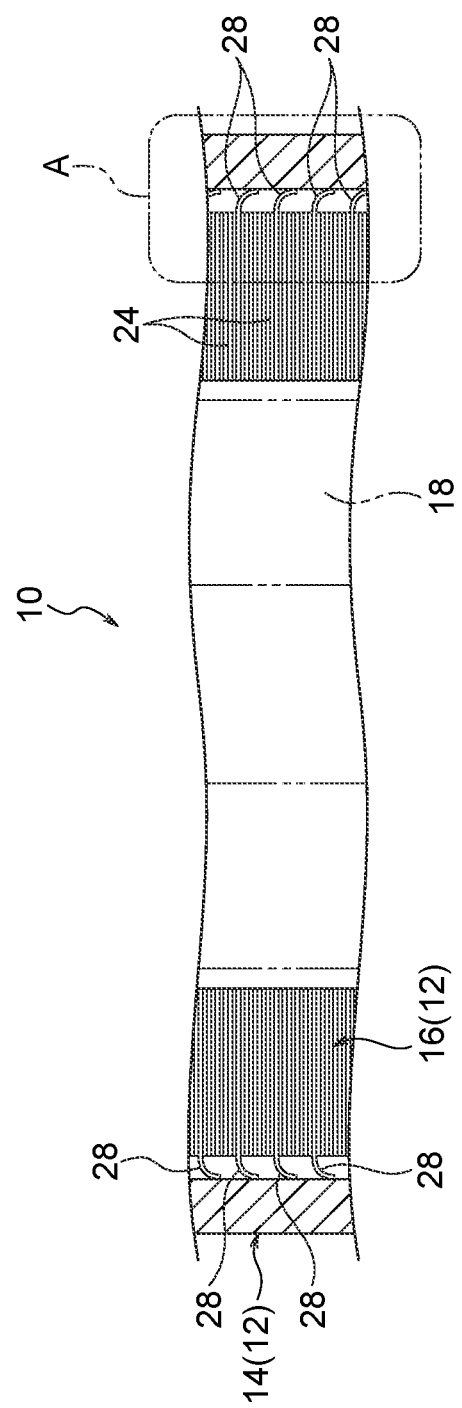
FIG. 2 is an enlarged cross-section sectioned along line F2-F2 in FIG. 1.

The rotor core 18 configures an iron rotor core, and is formed in a circular tube shape. The rotor core 18 is configured by stacking plural core plates. Note that FIG. 2 schematically illustrates the rotor core 18. A non-illustrated rotation shaft is coaxially fixed to an axial center portion of the rotor core 18. The rotation shaft is rotatably supported by the case 14 through non-illustrated shaft bearings. Plural magnet holes 20 are formed arrayed in a circumferential direction at an outer peripheral side of the rotor core. Non-illustrated permanent magnetics are inserted into these magnet holes 20.

The stator core 16 configures an iron stator core, and is formed in a substantially circular tube shape. The stator core 16 is configured by stacking plural core plates 24. Note that hatching has been omitted from the cross-section of the respective core plates 24 in FIG. 2 and FIG. 3. The plural core plates 24 are formed by punching ring shapes in an electromagnetic steel sheet, and are stacked in an axial line direction. A yoke portion 16A is provided at an outer peripheral side of the stator core 16, and plural teeth 16B are provided at an inner peripheral side of the stator core 16. The plural teeth 16B are arranged so as to be spaced at uniform intervals around the circumferential direction of the stator core 16. Non-illustrated windings are wound onto these teeth 16B to form coils.

The plural core plates 24 include one elastic protrusion-equipped core plate 24A for every predetermined number of plates (such as every ten plates) arrayed in a stacking direction. A predetermined number (such as nine) of protrusion-less core plates 24B are arranged between elastic protrusion-equipped core plates 24A that are closest to one another in the stacking direction. Namely, the plural core plates 24 are configured by the plural elastic protrusion-equipped core plates 24A and the plural protrusion-less core plates 24B. The plural protrusion-less core plates 24B and the plural elastic protrusion-equipped core plates 24A are joined together by for example stacking and crimping.

Figure 3:
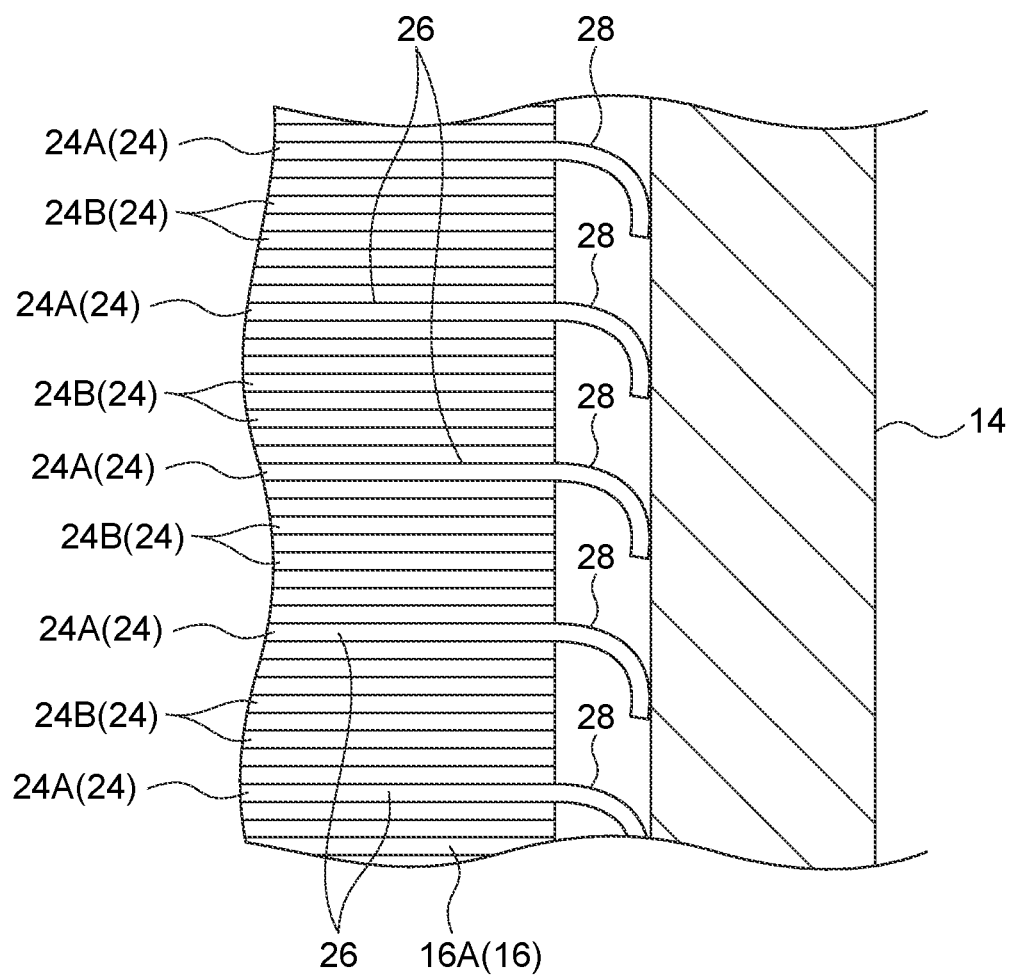
FIG. 3 is an enlarged cross-section illustrating a region indicated by the reference numeral A in FIG. 2.
Figure 4:
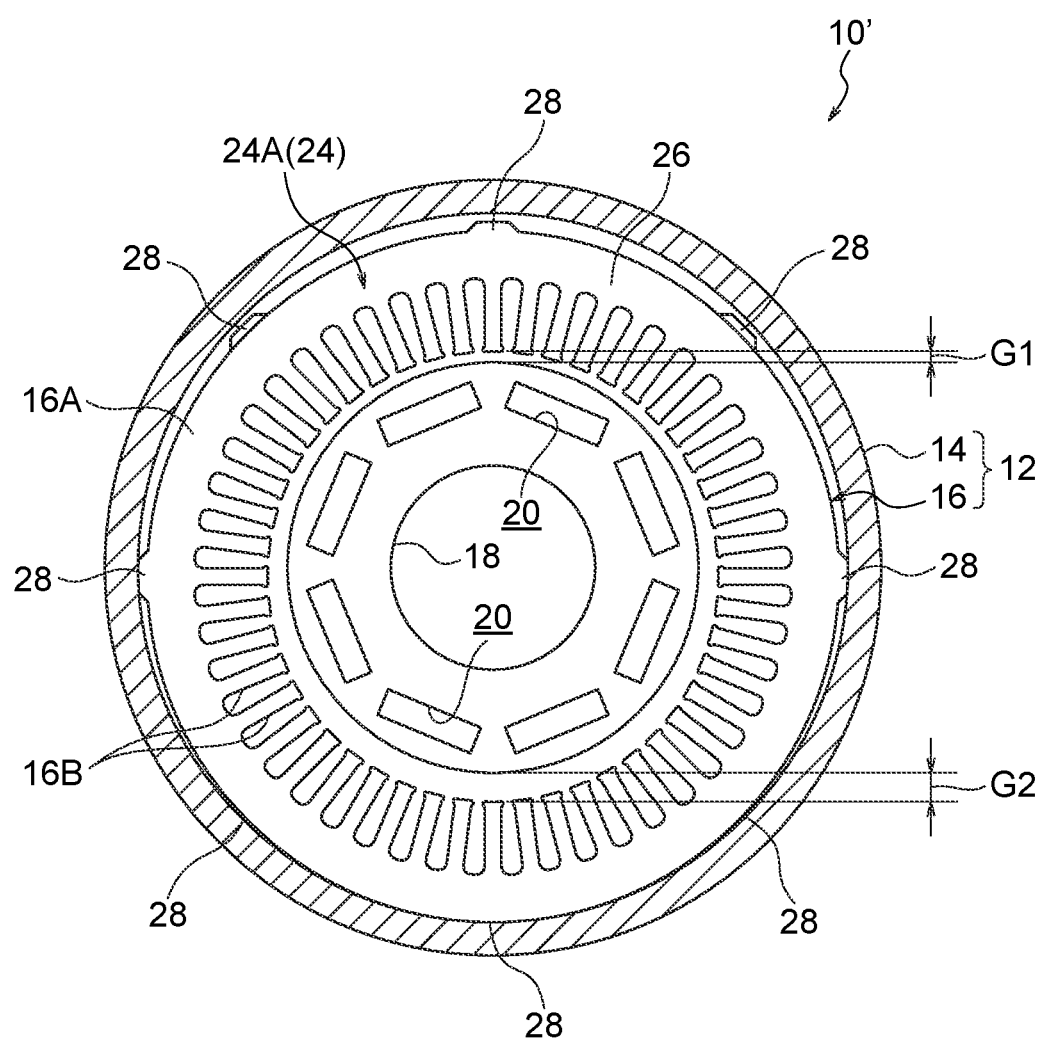
FIG. 4 is a cross-section corresponding to FIG. 1 for explaining decentering of a stator core.

Each of the protrusion-less core plates 24B is formed in a ring shape without any protrusions at an inner peripheral portion or an outer peripheral portion thereof. Each of the elastic protrusion-equipped core plates 24A includes a plate body 26 with a similar configuration to the protrusion-less core plates 24B, and plural elastic protrusions 28 that extend out from an outer peripheral portion of the plate body 26. Each of the plural elastic protrusions 28 extends toward a radial direction outside of the plate body 26, and is bent toward one axial direction side of the respective core plates 24. The plural elastic protrusions 28 are arranged so as to be arrayed at uniform intervals (at intervals of 90° in this example) around the circumferential direction of each of the core plates 24. Each of the elastic protrusions 28 is produced by bending a part of the electromagnetic steel sheet configuring the elastic protrusion-equipped core plate 24A, and is bent into a circular arc shape as viewed along the circumferential direction of the respective core plates 24 as illustrated in FIG. 2 and FIG. 3. The plural elastic protrusions 28 have spring properties. A form of quenching (heat treatment) such as carburizing and quenching is performed on the plural elastic protrusions 28.

As described above, in the present exemplary embodiment, the plural core plates 24 include one elastic protrusion-equipped core plate 24A for every predetermined number of plates arrayed in the stacking direction. Elastic protrusion-equipped core plates 24A that are closest to one another in the stacking direction with the predetermined number of protrusion-less core plates 24B therebetween are arranged so as to be offset in phase from one another at a predetermined angle (45° in this example) in the circumferential direction. Note that the number and layout of the elastic protrusions 28 may be modified as appropriate.

The stator core 16 with the above-described configuration is housed inside the case 14, and is supported (retained) by the case 14 in a state in which the plural elastic protrusions 28 are in contact with and elastically flexed by an inner peripheral face of the case 14. Namely, the stator core 16 is supported by the case 14 through the spring load generated by the plural flexed elastic protrusions 28 in the above manner, and is disposed coaxially to the case 14. The rigidity of the respective elastic protrusions 28 with respect to deformation toward a radial direction inside of the stator core 16 is set lower than the rigidity of the plate body 26 with respect to deformation toward the radial direction inside of the stator core 16. The spring load of the plural elastic protrusions 28 is set so as not to be greatly affected by any variation in an inner diameter dimension of the case 14 and an outer diameter dimension of the stator core 16.

Operation and Advantageous Effects

Next, explanation follows regarding operation and advantageous effects of the present exemplary embodiment.

In the present exemplary embodiment, the stator core 16 is configured by stacking the plural core plates 24 and is housed inside the case 14 of the motor 10. The plural core plates 24 include the elastic protrusion-equipped core plates 24A provided with the plural elastic protrusions 28 arrayed in the circumferential direction. The plural elastic protrusions 28 extend toward the radial direction outside from the outer peripheral portion of the elastic protrusion-equipped core plates 24A and are bent in the axial direction. The stator core 16 is supported by the case 14 in a state in which the plural elastic protrusions 28 are in contact with the inner peripheral face of the case 14 and elastically flexed. This enables compressive stress to be prevented or effectively suppressed from being generated at the yoke portion 16A of the stator core 16, thereby enabling less iron loss than hitherto. Moreover, dimensional variation of the case 14 and the stator core 16 can be absorbed by elastic flexing of the plural elastic protrusions 28, thereby facilitating dimensional accuracy control.

To supplement the above-described advantageous effects, in cases in which a circular tube-shaped stator core with a smooth outer peripheral portion is fixed to a motor case, for example, the stator core is generally fixed in the motor case by interference fitting. In such cases, load toward the radial direction inside acts on an outer peripheral face of the stator core, such that circumferential direction compressive stress is generated at a yoke portion of the stator core, and iron loss increases. Although it necessary to strictly control dimensional accuracy in order to reduce such compressive stress as much as possible, a certain degree of dimensional variation is bound to occur in reality. Moreover, since the stator core and the case have high rigidity, a slight dimensional variation leads to a large change in fixing force. There is accordingly a risk that the required fixing force might not be obtained in some situations, and so to prevent this from occurring the dimensional tolerance is designed so as to achieve an interference fit that reliably generates the required fixing force. In cases in which the maximum interference is within the range of variation, an excessive fixing force might be generated by any greater interference than necessary, and iron loss increases as a result of increased compressive stress acting on the yoke portion of the stator core.

To address this, in the present exemplary embodiment, the stator core 16 is supported by the case 14 through the spring load of the plural elastic protrusions 28 provided at outer peripheral portions of the elastic protrusion-equipped core plates 24A. The rigidity of the respective elastic protrusions 28 with respect to deformation toward the radial direction inside of the stator core 16 is set lower than the rigidity of the plate body 26 with respect to deformation toward the radial direction inside of the stator core 16. Thus, even when dimensional errors arise in the stator core 16 and the case 14, there is no major change in the radial direction load acting on the yoke portion 16A of the stator core 16, enabling the retention force of the stator core 16 to be kept within a suitable range. This enables less iron loss than hitherto, and enables the efficiency of the motor 10 to be increased.

Moreover, in the present exemplary embodiment, heat generated in the stator core 16 when the motor 10 is driven is transmitted to the case 14 through the plural elastic protrusions 28, enabling the heat to be dissipated from the case 14 to outside the motor 10. Namely, the plural elastic protrusions 28 function as a heat conducting member. Moreover, the plural elastic protrusions 28 are integrally provided to the outer peripheral portions of the elastic protrusion-equipped core plates 24A, thereby enabling the number of components to be reduced compared to cases in which a heat conducting member is provided as a separate body to the core plates 24, and thereby contributing to a reduction in manufacturing costs.

Moreover, in the present exemplary embodiment, a form of quenching such as carburizing and quenching is performed on the plural elastic protrusions 28. This enables settling to be suppressed in the respective elastic protrusions 28, enabling the durability of the respective elastic protrusions 28 to be improved. Settling of the plural elastic protrusions 28 can thereby be suppressed even in cases in which the motor 10 has a large attractive magnetic force, in cases in which the stator core vibrates violently, and in cases in which the stator core 16 has a high vibration frequency. This enables a situation such as that in a comparative example 10' illustrated in FIG. 4, in which the stator core 16 is irreversibly decentered with respect to the case 14, to be prevented from occurring (G1<G2 in FIG. 4).

Namely, when an attractive magnetic force between the rotor core 18 and the stator core 16 is generated at a force such that the elastic protrusions 28 undergo plastic deformation, the stator core 16 and the case 14 become irreversibly decentered. Such an attractive magnetic force is generated by eccentricity of the rotor core 18 and the stator core 16. The smaller the gap between the rotor core 18 and the stator core 16, the greater the attractive magnetic force, such that this promotes further decentering from the eccentricity already present. Settling of the elastic protrusions 28 becomes an issue as a result of such eccentricity occurring. However, the quenching process described above in the present exemplary embodiment enables such settling of the elastic protrusions 28 to be suppressed.

Next, explanation follows regarding other exemplary embodiments of the present disclosure. Note that configuration and operation that is basically the same as in an exemplary embodiment that has already been described is allocated the same reference numerals as in this exemplary embodiment, and explanation thereof is omitted.

Second Exemplary Embodiment

Figure 5:
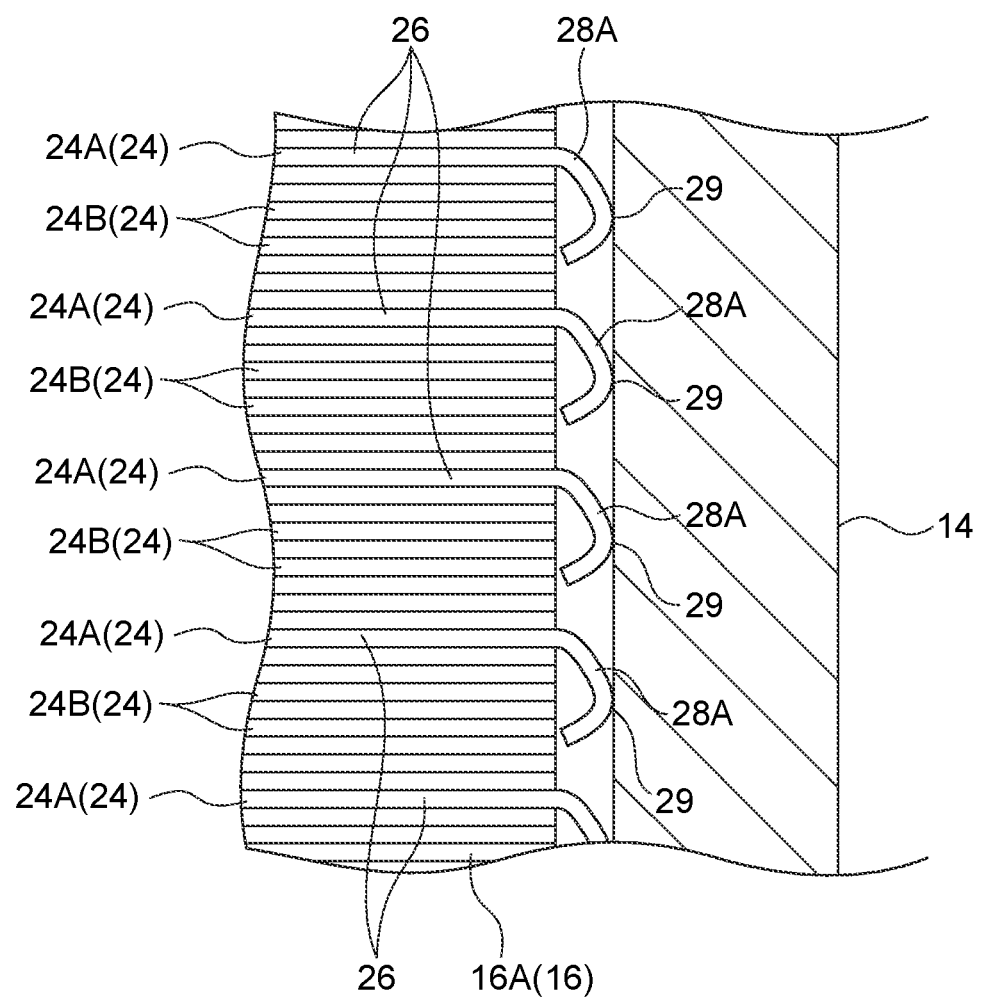
FIG. 5 is a cross-section corresponding to FIG. 3 illustrating a partial configuration of a motor according to a second exemplary embodiment of the present disclosure.

FIG. 5 is a cross-section corresponding to FIG. 3 illustrating a partial configuration of a motor according to a second exemplary embodiment of the present disclosure. The present exemplary embodiment has basically the same configuration as the first exemplary embodiment, with the exception that plural inward-facing elastic protrusions 28A are provided arrayed in the circumferential direction at the outer peripheral portion of each of the elastic protrusion-equipped core plates 24A. Similarly to the elastic protrusions 28 in the first exemplary embodiment, the inward-facing elastic protrusions 28A extend toward the radial direction outside of the plate body 26 and are bent toward one axial direction side of the respective core plates 24. However, the inward-facing elastic protrusions 28A are configured by being bent in two stages. Specifically, a bend

29 with a smaller bend radius than a base end portion side of the inward-facing elastic protrusion 28A is formed at a leading end portion side of each of the inward-facing elastic protrusions 28A. The leading end portion of the inward-facing elastic protrusion 28A is bent so as to face the radial direction inside of the corresponding elastic protrusion-equipped core plate 24A. The leading end portions of the inward-facing elastic protrusions 28A are arranged spaced apart from the outer peripheral face of the stator core 16. Moreover, the leading end portions of the respective inward-facing elastic protrusions 28A are configured so as not to contact the outer peripheral face of the stator core 16 within a range of dimensional variation occurring in the case 14 and the stator core 16.

Other configuration of the present exemplary embodiment is similar to that in the first exemplary embodiment. Thus, the present exemplary embodiment obtains basically the same operation and advantageous effects as those in the first exemplary embodiment. Moreover, in the present exemplary embodiment, when the stator core 16 is displaced in the radial direction with respect to the case 14, the amount of flexing of the inward-facing elastic protrusions 28A that are positioned in this displacement direction increases. The leading end portions of these inward-facing elastic protrusions 28A contact the outer peripheral face of the stator core 16 as a result, such that the spring constant of these inward-facing elastic protrusions 28A increases (changes). This enables displacement of the stator core 16 to be suppressed, thereby enabling plastic deformation of the inward-facing elastic protrusions 28A to be prevented. This enables irreversible decentering of the stator core 16 such as that illustrated in FIG. 4 to be prevented.

Moreover, when the amount of flexing of the inward-facing elastic protrusions 28A is small, namely when the leading end portions of the inward-facing elastic protrusions 28A are not in contact with the outer peripheral face of the stator core 16, the stator core 16 is supported by the case 14 through the spring load of the plural elastic protrusions 28. This enables compressive stress to be prevented or effectively suppressed from being generated in the yoke portion 16A of the stator core 16, thereby enabling less iron loss than hitherto. Moreover, dimensional variation of the case 14 and the stator core 16 can be absorbed by elastic flexing of the plural elastic protrusions 28, thereby facilitating dimensional accuracy control.

Third Exemplary Embodiment

Figure 6:
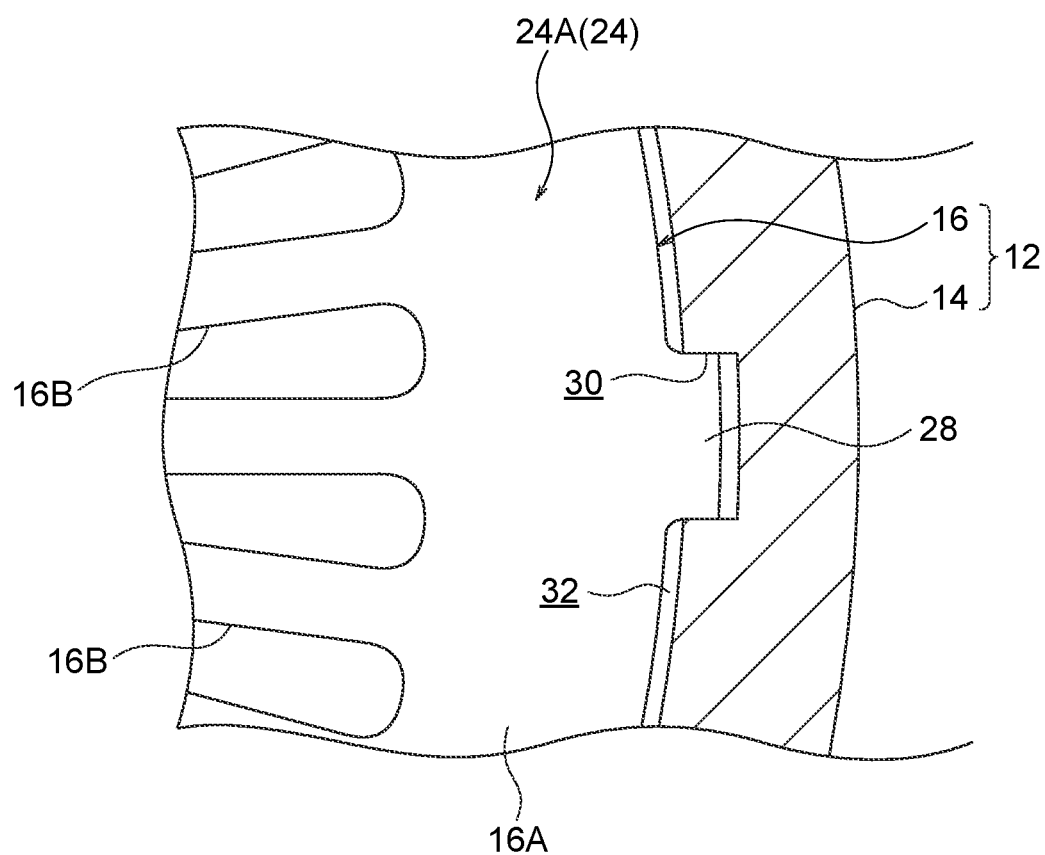
FIG. 6 is a cross-section corresponding to part of FIG. 1 illustrating a partial configuration of a motor according to a third exemplary embodiment of the present disclosure.

FIG. 6 is a cross-section corresponding to part of FIG. 1 illustrating a partial configuration of a motor according to a third exemplary embodiment of the present disclosure. The present exemplary embodiment has basically the same configuration as the first exemplary embodiment, with the exception that plural grooves 30 (only one of which is illustrated in FIG. 6) into which the plural elastic protrusions 28 can be inserted (slotted) are formed arrayed in the circumferential direction at the inner peripheral face of the case 14. The plural grooves 30 extend along the axial line direction of the case 14. The depth of these plural grooves 30 is set such that a ring-shaped gap 32 is formed between the inner peripheral face of the case 14 and the outer peripheral face of the stator core 16. The width of each of the grooves 30 is set so as to be the same as the width of each of the elastic protrusions 28. The present exemplary embodiment is configured such that, in cases in which the stator core 16 is displaced in the radial direction with respect to the case 14, a part of the outer peripheral face of the stator core 16 contacts a part of the inner peripheral face of the case 14 within an elastic deformation range of the plural elastic protrusions 28.

Other configuration of the present exemplary embodiment is similar to that in the first exemplary embodiment. Thus, the present exemplary embodiment also obtains basically the same operation and advantageous effects as those in the first exemplary embodiment. Moreover, the plural elastic protrusions 28 of the stator core 16 are inserted into the plural grooves 30 in the case 14. Thus, rotation torque generated when the motor 10 is driven can be borne by portions where the plural elastic protrusions 28 and the plural grooves 30 engage with each other. This enables relative rotation of the stator core 16 in the circumferential direction with respect to the case 14 to be restricted, thereby obviating the need for a rotation stopper such as a key. Moreover, the gap 32 is provided between the inner peripheral face of the case 14 and the outer peripheral face of the stator core 16, thereby enabling dimensional variation of the case 14 and the stator core 16 to be absorbed. Moreover, in the present exemplary embodiment, in cases in which the stator core 16 is displaced in the radial direction with respect to the case 14, a part of the outer peripheral face of the stator core 16 contacts a part of the inner peripheral face of the case 14, such that this displacement of the stator core 16 is restricted. In this state, the plural elastic protrusions 28 are still within their elastic deformation range, thereby enabling plastic deformation of the plural elastic protrusions 28 to be prevented. This enables irreversible decentering of the stator core 16 such as that illustrated in FIG. 4 to be prevented.

Fourth Exemplary Embodiment

Figure 7:
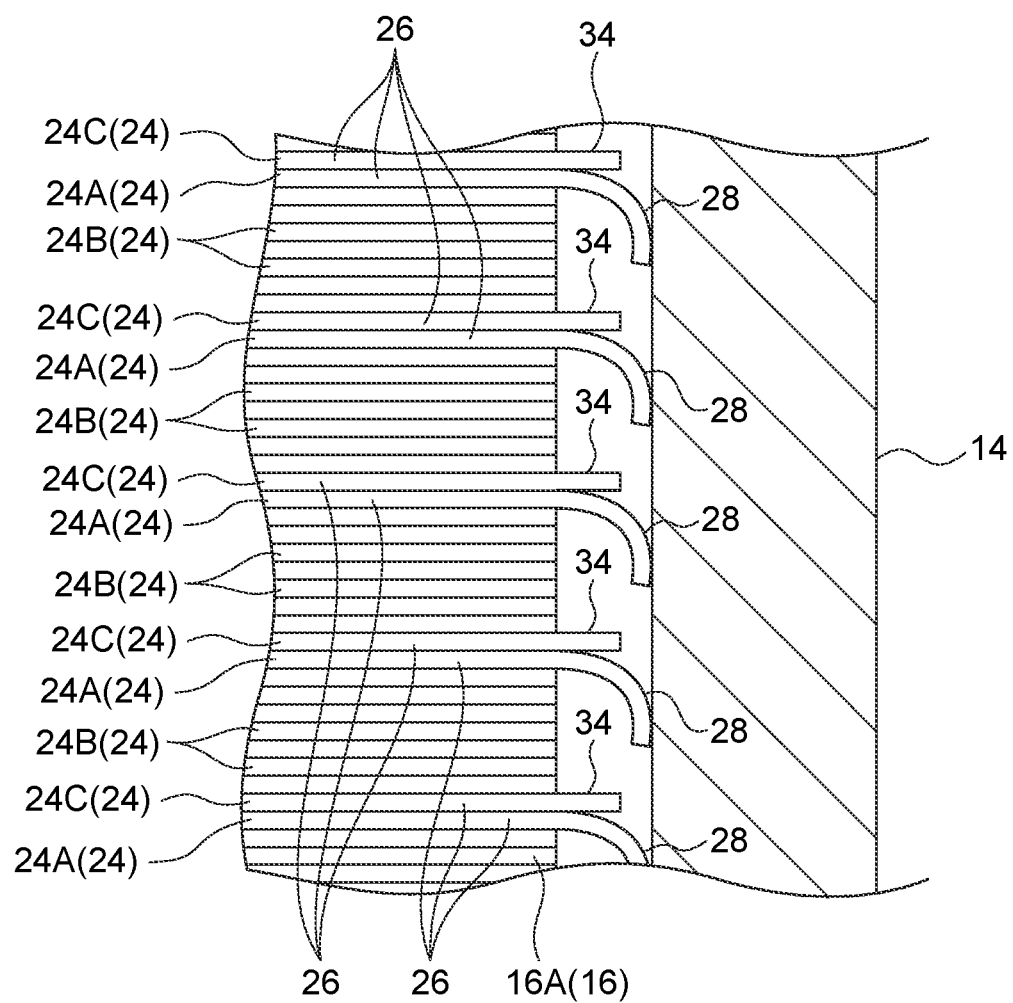
FIG. 7 is a cross-section corresponding to FIG. 3 illustrating a partial configuration of a motor according to a fourth exemplary embodiment of the present disclosure.

FIG. 7 is a cross-section corresponding to FIG. 3 illustrating a partial configuration of a motor according to a fourth exemplary embodiment of the present disclosure. The present exemplary embodiment has basically the same configuration as the first exemplary embodiment, with the exception that the plural core plates 24 include plural flat protrusion-equipped core plates 24C each provided with plural flat protrusions 34 arrayed in the circumferential direction so as to extend toward the radial direction outside from an outer peripheral portion thereof. Each of the flat protrusion-equipped core plates 24C includes a plate body 26 configured similarly to the protrusion-less core plates 24B, and the plural flat protrusions 34 extending out from an outer peripheral portion of the plate body 26. Leading end portions of the plural flat protrusions 34 are arranged opposing the inner peripheral face of the case 14 across a gap.

Other configuration of the present exemplary embodiment is similar to that in the first exemplary embodiment. Thus, the present exemplary embodiment also obtains basically the same operation and advantageous effects as in the first exemplary embodiment. Moreover, in the present exemplary embodiment, when the stator core 16 is displaced in the radial direction with respect to the case 14, the leading end portions of the flat protrusions 34 contact the inner peripheral face of the case 14, thereby enabling displacement of the stator core 16, namely deformation of the plural elastic protrusions 28, to be restricted. Plastic deformation of the plural elastic protrusions 28 can be prevented as a result.

The present disclosure has been described above with reference to several exemplary embodiments. However, various other modifications may be implemented within a range not departing from the spirit of the present disclosure. Obviously the scope of rights of the present disclosure is not limited to the above exemplary embodiments.

The entire content of the disclosure of Japanese Patent Application No. 2019-189689 filed on Oct. 16, 2019 is incorporated by reference in the present specification. All cited documents, patent applications, and technical standards mentioned in the present specification are incorporated by reference in the present specification to the same extent as if each individual cited document, patent application, or technical standard was specifically and individually indicated to be incorporated by reference.

The invention claimed is:

1. A stator core that is configured by stacking a plurality of core plates and that is housed inside a case of a motor, wherein:
the plurality of core plates include a plurality of elastic protrusion-equipped core plates provided with a plurality of elastic protrusions arrayed in a circumferential direction, the elastic protrusions extending toward a radial direction outside from an outer peripheral portion of the elastic protrusion-equipped core plates and being bent in an axial direction; and
the stator core is supported by the case in a state in which the plurality of elastic protrusions are in contact with an inner peripheral face of the case and elastically flexed,
wherein the plurality of core plates include a plurality of flat protrusion-equipped core plates provided with a plurality of flat protrusions arrayed in the circumferential direction so as to extend toward the radial direction outside from an outer peripheral portion of the flat protrusion-equipped core plates,
wherein leading end portions of the plurality of flat protrusions are arranged opposing the inner peripheral face of the case across a gap,
wherein the plurality of elastic protrusions are bent to one side in the axial direction,
wherein the plurality of flat protrusion equipped core plates are stacked on another side of the plurality of elastic protrusion-equipped core plates in the axial direction, and
wherein the plurality of elastic protrusions and the plurality of flat protrusions are arranged side by side in the axial direction.

2. The stator core of claim 1, wherein the plurality of elastic protrusions include an inward-facing elastic protrusion with a leading end portion that is bent so as to face a radial direction inside of the elastic protrusion-equipped core plate.

3. The stator core of claim 1, wherein quenching is performed on the plurality of elastic protrusions.

4. A stator unit comprising:
a case of a motor; and
the stator core of claim 1 housed inside the case.

5. A stator unit comprising:
a case of a motor; and
a stator core that is configured by stacking a plurality of core plates and that is housed inside the case of the motor,
wherein the plurality of core plates include an elastic protrusion-equipped core plate provided with a plurality of elastic protrusions arrayed in a circumferential direction, the elastic protrusions extending toward a radial direction outside from an outer peripheral portion of the elastic protrusion-equipped core plate and being bent in an axial direction,
wherein the stator core is supported by the case in a state in which the plurality of elastic protrusions are in contact with an inner peripheral face of the case and elastically flexed, wherein a plurality of grooves, into which the plurality of elastic protrusions are configured to be inserted, are arrayed in a circumferential direction at the inner peripheral face of the case, and wherein a gap is provided between the inner peripheral face of the case and an outer peripheral face of the stator core.

6. The stator unit of claim 5, wherein, in a case in which the stator core is displaced in a radial direction with respect to the case, a part of the outer peripheral face of the stator core contacts a part of the inner peripheral face of the case within an elastic deformation range of the plurality of elastic protrusions.

7. A motor comprising:
the stator unit of claim 4; and
a rotor core housed inside the stator core included in the stator unit.

* * * * *